United States Patent [19]
Liao

[11] Patent Number: 5,703,306
[45] Date of Patent: Dec. 30, 1997

[54] DEVICE HOLDER FOR DRUMS

[75] Inventor: Tsun-Chi Liao, Taichung, Taiwan

[73] Assignee: Hwa Shin Musical Instrument Co., Ltd., Taichung, Taiwan

[21] Appl. No.: 677,624

[22] Filed: Jul. 8, 1996

[51] Int. Cl.$^6$ ................................................. G10D 13/02
[52] U.S. Cl. .................... 84/421; 84/402; 248/229.11; 248/229.13
[58] Field of Search .................. 84/421, 402, 422.3, 84/453; 248/218.4, 229.11, 229.13, 229.1

[56] References Cited

U.S. PATENT DOCUMENTS

| | | | |
|---|---|---|---|
| 1,230,192 | 6/1917 | Manning | 84/421 |
| 3,561,716 | 2/1971 | Thompson | 84/421 |

*Primary Examiner*—Cassandra C. Spyrou
*Attorney, Agent, or Firm*—Bacon & Thomas

[57] ABSTRACT

A device holder for drums, including a base frame having two eyed lugs bilaterally disposed at one end and a bolt hole spaced between the eyed lugs and a longitudinal open-ended slot at an opposite end, box end bolt inserted through the through hole of the base frame and screwed up with a wing nut to hold a rod member with an instrument in the eyed lugs, an arched retaining block having a fixed end pivoted to the base frame in the middle and a free end, and a locating bolt having a head pivoted to the free end of the arched retaining block and a screw body detachably secured to the longitudinal open-ended slot of the base frame by a wing nut to secure the curved retaining block and the base frame to one tie rod between two counterloops of a drum.

3 Claims, 6 Drawing Sheets the rod member.

DEVICE HOLDER FOR DRUMS

BACKGROUND OF THE INVENTION

The present invention relates to a device holder for drums which can be conveniently fastened to one of the counterloop tie rods of any of a variety of drums to hold a rod member and an instrument on the rod member.

When an instrument for example, a cow bell, a microphone, a cymbal, etc., is to be used with bongos, tom-toms, or a conga drum, an instrument stand shall be used. However, when an additional instrument stand is used, much installation space is needed. Furthermore, a drum is generally mounted with two counterloops connected at different elevations by tie rods to hold the top head and the bottom head. It is practical to fasten holder means to the tie rods for holding a rod member and an instrument on the rod member.

SUMMARY OF THE INVENTION

The present invention has been accomplished under the circumstances in view. It is one object of the present invention to provide an instrument holder which can be conveniently and detachably fastened to a drum to hold a rod member with an instrument. It is another object of the present invention to provide an instrument holder which fits any of a variety of drums. It is still another object of the present invention to provide an instrument holder which can be conveniently fastened to a drum and adjusted to the desired angle to hold a rod member with an instrument. It is still another object of the present invention to provide an instrument holder for fastening to a drum to hold a rod member with an instrument which is compact and handy. To achieve these and other objects of the present invention, there is provided a device holder for drums, which comprises a base frame having two eyed lugs bilaterally disposed at one end and a bolt hole spaced between the eyed lugs and a longitudinal open-ended slot at an opposite end, box end bolt inserted through the through hole of the base frame and screwed up with a wing nut to hold a rod member with an instrument in the eyed lugs, an arched retaining block having a fixed end pivoted to the base frame in the middle and a free end, and a locating bolt having a head pivoted to the free end of the arched retaining block and a screw body detachably secured to the longitudinal open-ended slot of the base frame by a wing nut to secure the curved retaining block and the base frame to one tie rod between two counterloops of a drum.

DETAILED DESCRIPTION OF THE PREFERRED EMBODIMENT

Figure 1:
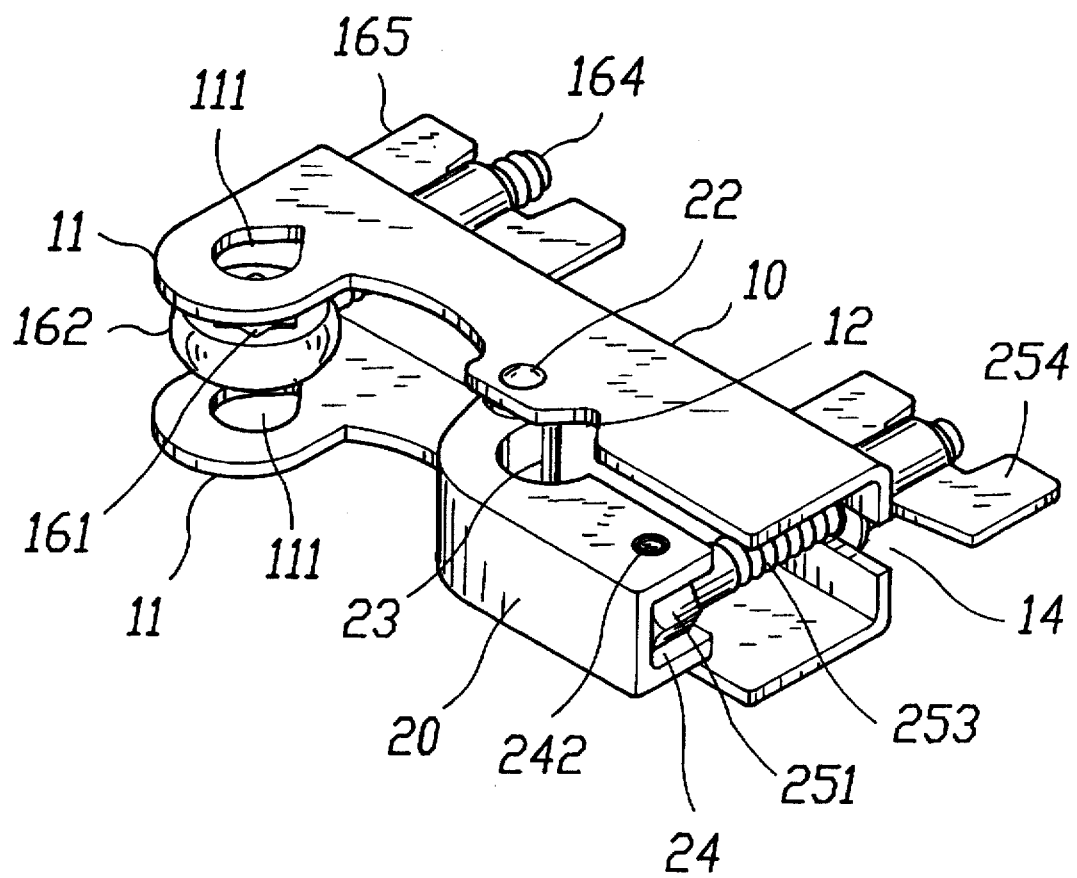
FIG. 1 is an elevational view of a device holder according to the present invention.
Figure 2:
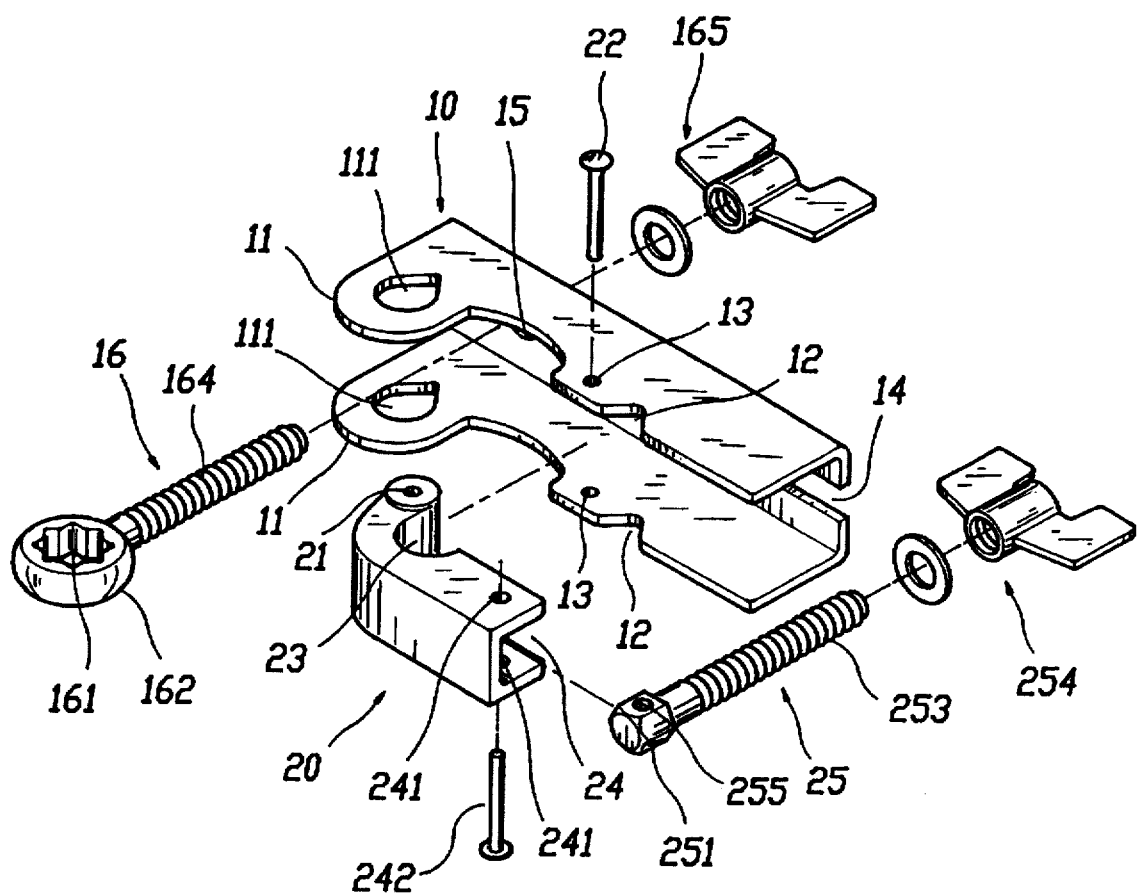
FIG. 2 is an exploded view of the device holder shown in FIG. 1.
Figure 3:
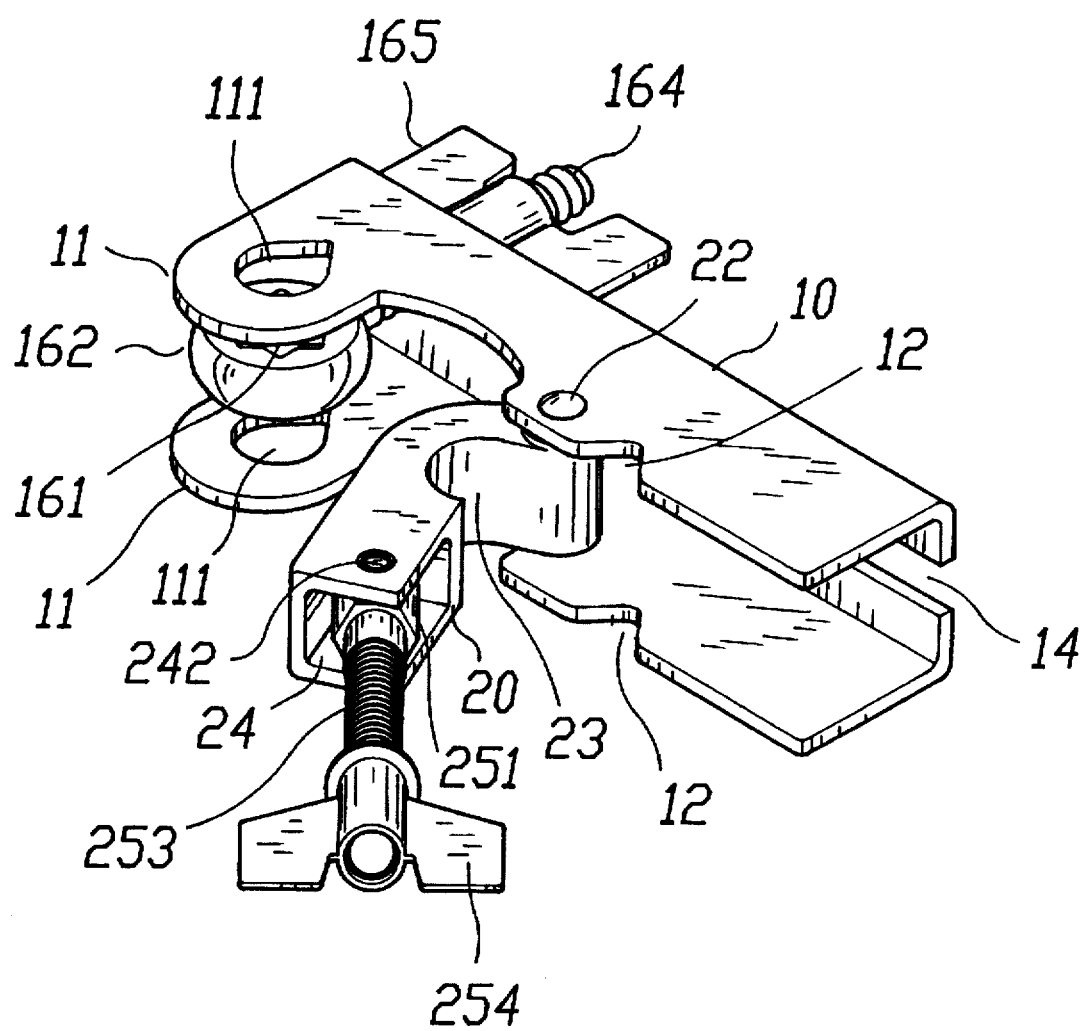
FIG. 3 is similar to FIG. 1 but showing the movable locating bolt disconnected from the longitudinal open-ended slot of the base frame.

Referring to FIGS. 1, 2, and 3, the base frame, referenced by 10, is shaped like a U-channel comprising two upright lugs 11 respectively raised from the two opposite upright side walls thereof at one end and defining a respective through hole 111, a longitudinal open-ended slot 14 disposed in the middle of the bottom wall thereof at an opposite end, two arched notches 12 respectively formed in the two opposite upright side walls at the top and spaced from the upright lugs 11, two pivot holes 13 respectively formed in the two opposite upright side walls between the upright lugs 11 and the arched notches 12, and a bolt hole 15 formed in the bottom wall between the upright lugs 11. A holding down device 16 mounted in the bolt hole 15 and adapted for securing a rod member 17 to hold an instrument 33, 34, 35 (see also FIGS. 4, 5, and 6). The holding down device 16 comprises a box end screw bolt 164 inserted through the bolt hole 15, and a wing nut 165 threaded onto the box end screw bolt 154. The box end screw bolt 154 has a box end 162 defining a box 161. A curved retaining block 20 is provided having a first pivot hole 21 transversely disposed at one end and pivotably connected between the pivot holes 13 of the base frame 10 by a pivot 22, an opening 24 at an opposite end, two second pivot holes 241 aligned at two opposite sides of the opening 24, and an arched bottom notch 23 spaced between the first pivot hole 21 and the second pivot holes 241 and adapted for acting with the arched notches 12 of the base frame 10. A movable locating screw bolt 25 is connected to the curved retaining block 20 and screwed up with a wing nut 254 to secure the curved retaining block 20 to a drum 30 (see also FIG. 4). The movable locating screw bolt 25 comprises a screw body 253 adapted for inserting through the longitudinal open-ended slot 14 of the base frame 10 and then screwing up with the wing nut 254, a head 251 at one end of the screw body 253. The head 251 of the movable locating screw bolt 25 has a pivot hole 255 connected between the second pivot holes 241 of the curved retaining block 20 by a pivot 242.

Figure 4:
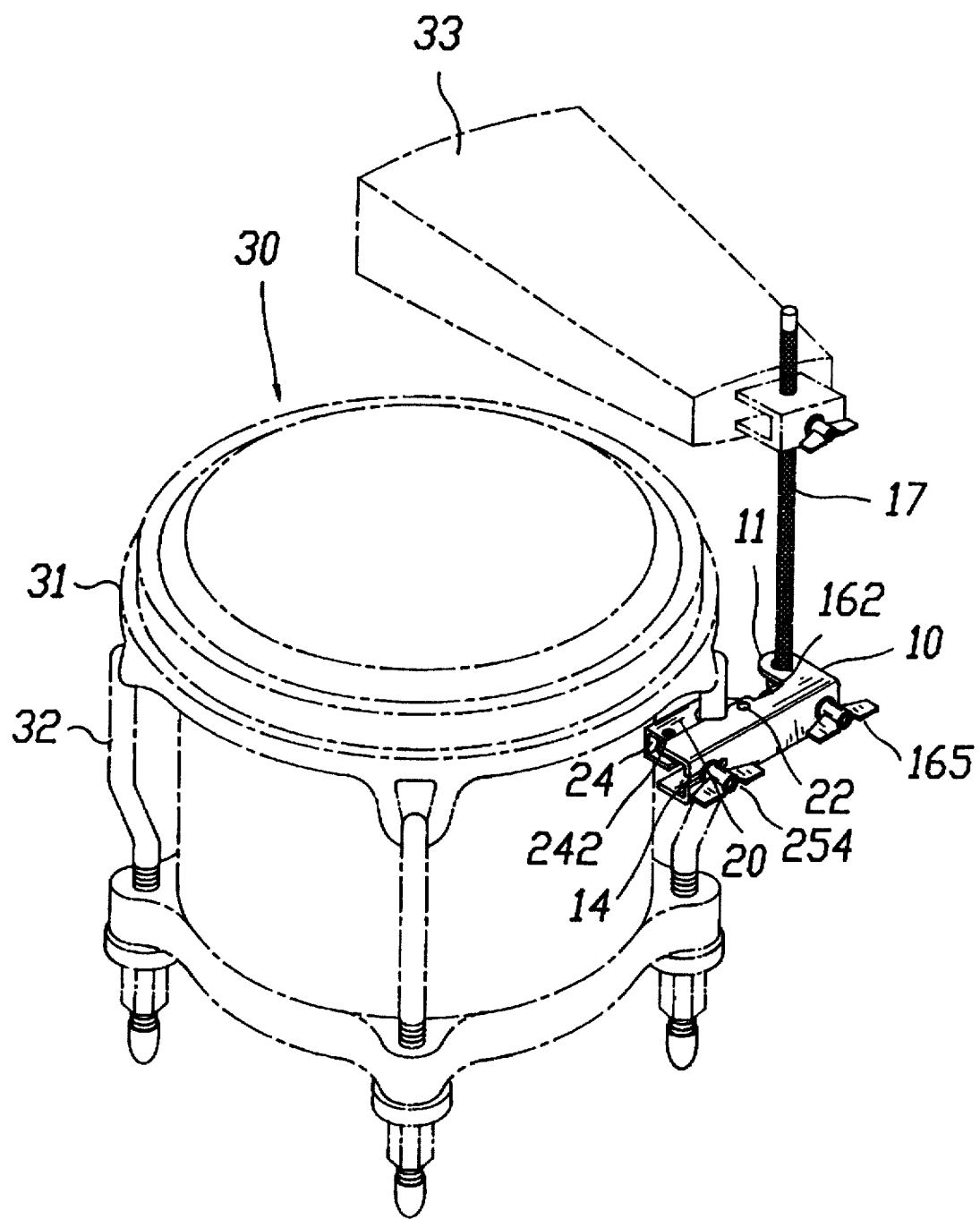
FIG. 4 is an applied view of the present invention, showing the device holder fastened to a drum, and a rod member with a cow bell fastened to the device holder.
Figure 5:
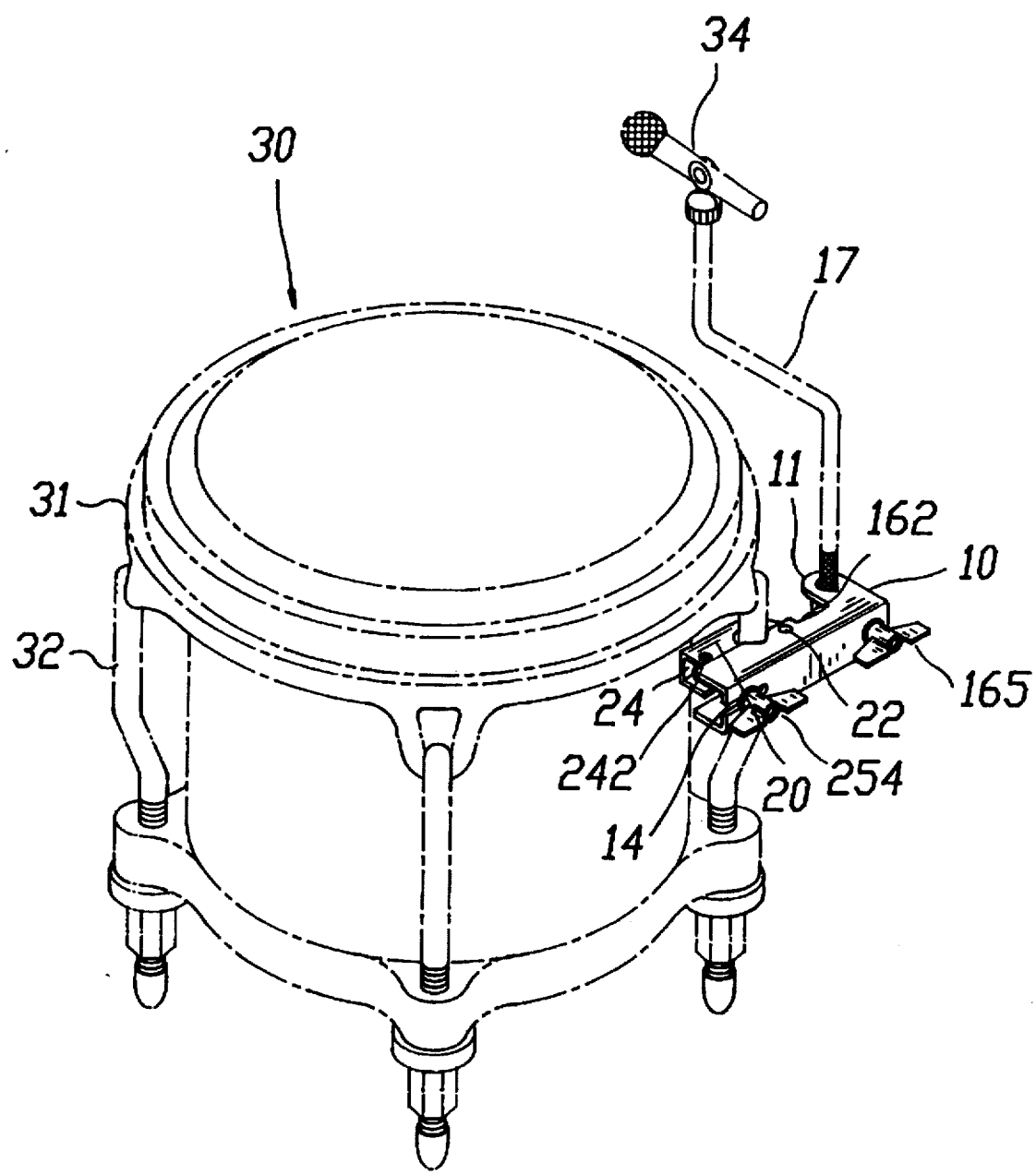
FIG. 5 is another applied view of the present invention, showing the device holder fastened to a drum, and a rod member with a microphone fastened to the device holder.
Figure 6:
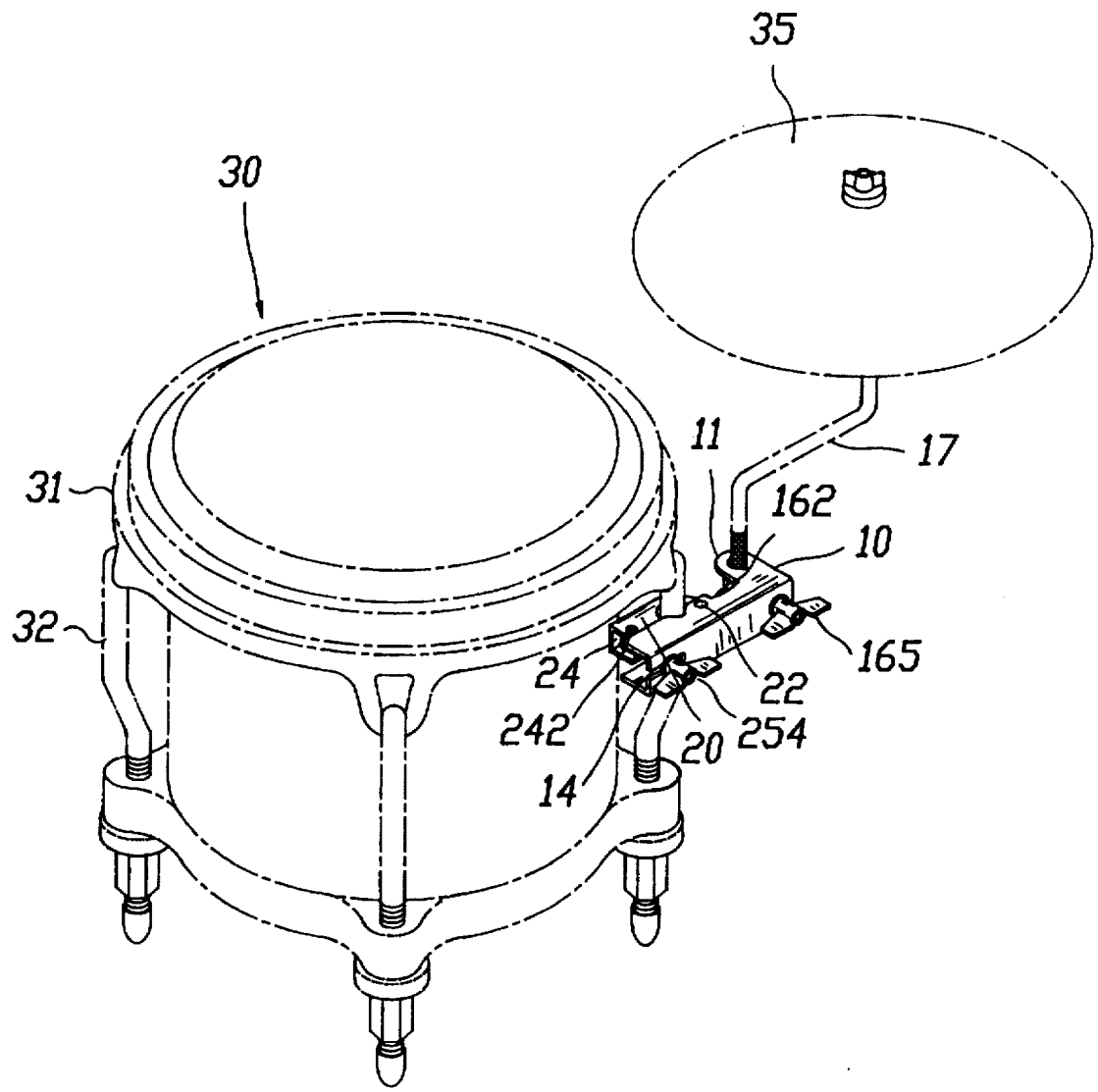
FIG. 6 is still another applied view of the present invention, showing the device holder fastened to a drum, and a rod member with a cymbal fastened to the device holder.

Referring to FIGS. 4, 5, and 6, when the wing nut 254 is loosened from the screw body 253 of the movable locating screw bolt 25, the movable locating screw bolt 25 and the curved retaining block 20 can be inserted through the space between one tie rod 32, which is connected between two vertically spaced counterloops 31 of the drum 30, and the periphery of the drum 30. After the movable locating screw bolt 25 and the curved retaining block 20 are inserted through the space between the designated tie rod 32 and the periphery of the drum 30, the movable locating screw bolt 25 is turned inwardly into the longitudinal open-ended slot 14 of the base frame 10, and then the wing nut 254 is threaded onto the screw body 253 of the movable locating screw bolt 25 to secure the movable locating screw bolt 25 firmly in place, permitting the designated tie rod 32 to be firmly retained in the arched bottom notch 23 and the arched notches 12 between curved retaining block 20 and the base frame 10, and therefore the device holder is fixed to the drum 30. When the device holder is installed, a rod member 17 can then be fastened to the through holes 111 of the upright lugs 11 of the base frame 10 and the box 161 of the box end 162 of the holding down device 16 to hold an instrument for example a cow bell 33 as shown in FIG. 4, a microphone 34 as shown in FIG. 5, a cymbal 35 as shown in FIG. 6.

I claim:

1. A device holder adapted for fastening to a tie rod between two counterloops of a drum to hold a rod member and an instrument on the rod member, the device holder comprising:

a base frame shaped as a U-channel, said base frame comprising a bottom wall, two parallel upright side walls raised from said bottom wall at two opposite sides, two upright lugs respectively raised from said upright side walls at one end and defining a respective through hole, a longitudinal open-ended slot disposed in said bottom wall at an opposite end remote from said upright lugs, two arched notches respectively disposed at said upright side walls, two pivot holes respectively formed in said upright side walls and disposed between said upright lugs and said arched notches, and a bolt hole formed in said bottom wall between said upright lugs;

a holding down device mounted in the bolt hole of said base frame and adapted for securing a rod member in the through holes of said upright lugs to hold an instrument;

a curved retaining block having a fixed end pivotably connected between the pivot holes of said base frame by a pivot, an open-ended free end, and an arched bottom notch adapted for acting with the arched notches of said base frame to secure said base frame to one tie rod of the drum; and a fastening device pivoted to the open-ended free end of said curved retaining block and adapted for securing the open-ended free end to the bottom wall of said base frame for permitting the arched bottom notch of said curved retaining block and the arched notches of said base frame to be clamped on the tie rod of the drum.

2. The device holder of claim 1 wherein said holding down device comprises a box end screw inserted through the bolt hole of said base frame, and a wing nut threaded onto said box end screw, said box end screw having a box end aligned between the through holes of said upright lugs.

3. The device holder of claim 1 wherein said fastening device comprises a locating screw bolt having a head pivotably connected to the open-ended free end of said curved retaining block by a pivot and a screw body extending from said head, and a wing nut threaded onto the screw body of said locating screw bolt to secure it to the longitudinal open-ended slot of said base frame.

* * * * *